(12) United States Patent
Hayashida

(10) Patent No.: US 7,815,884 B2
(45) Date of Patent: *Oct. 19, 2010

(54) METHOD FOR PRODUCING POLYCRYSTALLINE SILICON

(75) Inventor: Satoshi Hayashida, Kumamoto (JP)

(73) Assignee: Chisso Corporation, Osaka (JP)

( * ) Notice: Subject to any disclaimer, the term of this patent is extended or adjusted under 35 U.S.C. 154(b) by 247 days.

This patent is subject to a terminal disclaimer.

(21) Appl. No.: 12/051,536

(22) Filed: Mar. 19, 2008

(65) Prior Publication Data

US 2008/0233038 A1    Sep. 25, 2008

(30) Foreign Application Priority Data

Mar. 19, 2007  (JP)  ............................. 2007-069885

(51) Int. Cl.
   *C01B 33/03*   (2006.01)
   *C01B 9/02*    (2006.01)
   *C01B 33/033*  (2006.01)
(52) U.S. Cl. ....................... 423/350; 423/342; 423/463; 423/486; 423/491; 423/498; 423/499.1; 423/499.4; 423/499.5
(58) Field of Classification Search ................. 423/324, 423/344, 348, 349, 350, 240 R, 497, 499.1, 423/499.4, 488, 481, 491; 438/488
See application file for complete search history.

(56) References Cited

U.S. PATENT DOCUMENTS

| 2006/0270199 A1* | 11/2006 | Shimamune et al. | ........ 438/479 |
| 2007/0123011 A1* | 5/2007 | Honda et al. | ................ 438/488 |
| 2008/0226531 A1* | 9/2008 | Honda et al. | ................ 423/350 |
| 2008/0233036 A1* | 9/2008 | Hayashida | .................. 423/348 |

FOREIGN PATENT DOCUMENTS

| JP | 11-092130 | 4/1999 |
| JP | H11-92130 | 4/1999 |

* cited by examiner

*Primary Examiner*—Wayne Langel
*Assistant Examiner*—Syed Iqbal
(74) *Attorney, Agent, or Firm*—J.C. Patents

(57) ABSTRACT

To provide a method for producing polycrystalline silicon at relatively low cost, wherein the amount of waste generated is reduced by decreasing the amount of waste generated in producing polycrystalline silicon from silicon chloride by a method of reduction and increasing the amount of reused auxiliary raw materials. In the production of polycrystalline silicon using a gas phase reaction of a silicon chloride gas and a reducing agent gas, a chlorine gas is blown into an exhaust gas discharged from a reaction device to initiate a reaction, an unreacted reducing agent and silicon particles contained in the exhaust gas are chlorinated, and then a reducing agent chloride contained in the exhaust gas is separated from the other impurities and recovered.

19 Claims, 2 Drawing Sheets

METHOD FOR PRODUCING POLYCRYSTALLINE SILICON

CROSS-REFERENCE TO RELATED APPLICATION

This application claims the priority benefit of Japan application serial no. JP2007-069885, filed Mar. 19, 2007. All disclosure of the Japan application is incorporated herein by reference.

BACKGROUND OF THE INVENTION

1. Field of the Invention

The present invention relates to a method for producing polycrystalline silicon. More specifically, it relates to a recycling-oriented method for producing polycrystalline silicon that, in producing silicon from silicon chloride by a method of reduction, allows a chlorine gas to touch an exhaust gas containing a reducing agent chloride gas generated as a by-product, an unreacted reducing agent and silicon particles in order to allow them to react with each other, and then separates and recovers a reducing agent chloride from the other impurities, while remarkably decreasing the amount of the impurities, and decreases the amount of waste generated as much as possible.

2. Description of Related Art

In these years, the lowering in the emission of carbon dioxide being thought of one of causative substances for global warming has increasingly been demanded in order to prevent the global warming. Therefore, it has been difficult to construct a thermoelectric power plant, and interest in photovoltaic power generation is growing as a technique to meet demand for new electricity.

In photovoltaic power generation, electricity is obtained from solar light using silicon-based solar batteries. As silicon used in solar batteries, substandard one of those for semiconductors has been mainly used, but if facilities for photovoltaic power generation are spread and demand of solar batteries is exponentially increased in future, there may be a fear that the supply of silicon becomes insufficient.

Therefore, in addition to the production of silicon for semiconductors, it is necessary to produce silicon for solar batteries. As one solution, a method of producing silicon from silicon tetrachloride using a zinc reduction technique is proposed, and there is proposed a method in which zinc chloride generated as a by-product is recovered after electrolysis as zinc and chlorine, and then zinc is used as a raw material for reduction of silicon tetrachloride whereas chlorine is used for production of silicon chloride (for example, see Patent document 1). However, in an exhaust gas discharged from a reactor for zinc reduction, not only a zinc chloride gas generated as a by-product but also an unreacted gas and silicon particles may remain, and if zinc chloride recovered by cooling and condensation of the zinc chloride gas is used for electrolysis as it is, the deterioration of electrolysis efficiency may be caused, and in an extreme case, electrolysis may be impossible. The use of zinc chloride generated as a by-product for electrolysis includes problems that a purification step like melt filtration or distillation is necessary, whose process is complicated even in any kind of purification step, and the amount of waste is increased because of residue.

Patent document 1: JP H11-92130 A (1999)

SUMMARY OF THE INVENTION

Problem to be Solved by the Invention

It is an object of the present invention to realize a recycling-oriented method for producing polycrystalline silicon that, in producing silicon from silicon chloride by a method of reduction, remarkably decreases the amount of impurities contained in a reducing agent chloride generated as a by-product, and converts it into a form suitable for electrolysis, thereby decreasing the amount of waste generated as much as possible. Further, it is also an object to provide a method for producing polycrystalline silicon at relatively low cost through the simplification of the process.

Means to Solve the Problem

The inventors conducted many studies keenly to solve the above-described problem. As a result, the inventors found that the above-described problem is solved by a method for producing polycrystalline silicon using a gas phase reaction of a silicon chloride gas and a reducing agent gas including a step of blowing a chlorine gas into an exhaust gas discharged from a reaction device to initiate a reaction; a step of chlorinating an unreacted reducing agent and silicon particles contained in the exhaust gas; a step of separating a reducing agent chloride contained in the exhaust gas from the other impurities; and a step of recovering the reducing agent chloride, and completed the present invention on the basis of these findings.

The present invention is constituted as follows.

(1) A production method for producing polycrystalline silicon, wherein the production method conducts a gas phase reaction of a silicon chloride gas and a reducing agent gas in a reactor, including a step of blowing a chlorine gas into an exhaust gas containing a reducing agent chloride gas generated as a by-product in the gas phase reaction and unreacted gases to initiate a reaction, a step of separating a reducing agent chloride contained in the exhaust gas from the other impurities, and a step of recovering the reducing agent chloride.

(2) The production method for producing polycrystalline silicon described in (1), wherein the gas phase reaction of a silicon chloride gas and a reducing agent gas is conducted at a temperature in the range of 800 to 1200° C.

(3) The production method for producing polycrystalline silicon described in (1) or (2), wherein the reaction initiated by blowing a chlorine gas into an exhaust gas is conducted at a temperature in the range of 400 to 1200° C.

(4) The production method for producing polycrystalline silicon described in any one of (1) to (3), wherein the reaction initiated by blowing a chlorine gas into an exhaust gas is conducted by blowing a chlorine gas into an exhaust gas from a chlorine gas introducing pipe installed in a chlorination reaction device connected to a reactor in which a gas phase reaction of a silicon chloride gas and a reducing agent gas is conducted.

(5) The production method for producing polycrystalline silicon described in (4), wherein the chlorination reaction device used for an exhaust gas and a chlorine gas is constituted of an exhaust gas extracting pipe that discharges an exhaust gas from a reactor and a chlorine gas introduction pipe connected thereto.

(6) The production method for producing polycrystalline silicon described in any one of (1) to (5), wherein a reaction gas generated by a reaction of an exhaust gas and a chlorine gas is cooled so that a reducing agent chloride produced is isolated and recovered as a liquid or a solid.

(7) The production method for producing polycrystalline silicon described in any one of (1) to (5), wherein a reaction gas generated by a reaction of an exhaust gas and a chlorine gas is cooled, and a reducing agent chloride produced is isolated and recovered, and further, from the reaction gas, chlorine and silicon chloride are isolated and recovered.

(8) The production method for producing polycrystalline silicon described in any one of (1) to (7), wherein the silicon chloride gas is at least one kind of gas selected from the group consisting of chlorosilanes expressed by $Si_mH_nCl_{2m+2-n}$ (m is an integer of 1 to 3, and n is an integer being 0 or more although not exceeding 2m+2).

(9) The production method for producing polycrystalline silicon described in any one of (1) to (7), wherein the silicon chloride gas is a silicon tetrachloride gas.

(10) The production method for producing polycrystalline silicon described in any one of (1) to (9), wherein the reducing agent gas is at least one kind of gas selected from the group consisting of sodium, potassium, magnesium, zinc and hydrogen.

(11) The production method for producing polycrystalline silicon described in any one of (1) to (9), wherein the reducing agent gas is a zinc gas.

Effect of the Invention

According to the present invention, an unreacted reducing agent and silicon particles contained in an exhaust gas consisting mainly of a reducing agent chloride gas generated as a by-product during the production of silicon from silicon chloride using a method of reduction are allowed to react directly with a chlorine gas, and then isolated and recovered. This can remarkably decrease the amount of impurities contained in the by-product reducing agent chloride and convert the reducing agent chloride into a form suitable for electrolysis.

In other words, according to the present invention, an unreacted reducing agent is converted into to a reducing agent chloride, which is recovered together with the other reducing agent chlorides in an exhaust gas, and decomposed by electrolysis into chlorine and a reducing agent. As a result, it becomes possible to use the chlorine as a raw material for producing silicon chloride and to use for a reaction thereof with an unreacted reducing agent and silicon particles contained in an exhaust gas; and to use the reducing agent as a raw material for producing silicon by a method of reduction. The silicon particles react with chlorine to form a silicon chloride gas, which can be reused as a raw material for a reduction reaction together with an unreacted silicon chloride gas generated during the reduction reaction. Further, the unreacted chlorine gas is isolated and recovered in a similar way, and then reused for producing silicon chloride and for a reaction thereof with the above-described unreacted reducing agent and silicon particles contained in an exhaust gas.

Further, conversion of a recovered reducing agent chloride into a form suitable for electrolysis not only enables conducting electrolysis with a high efficiency, but also eliminates the need for a purification step like melt filtration or distillation of a reducing agent chloride obtained by the conventional method in order to use it in electrolysis, thereby simplifying the process and eliminating waste generated in such a purification step.

Furthermore, the enhanced quality of materials to be sent to a next step allows the amounts of residue and waste generated in respective steps to be decreased as much as possible and many raw materials to be reused, thereby enabling the production of polycrystalline silicon at relatively low cost.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
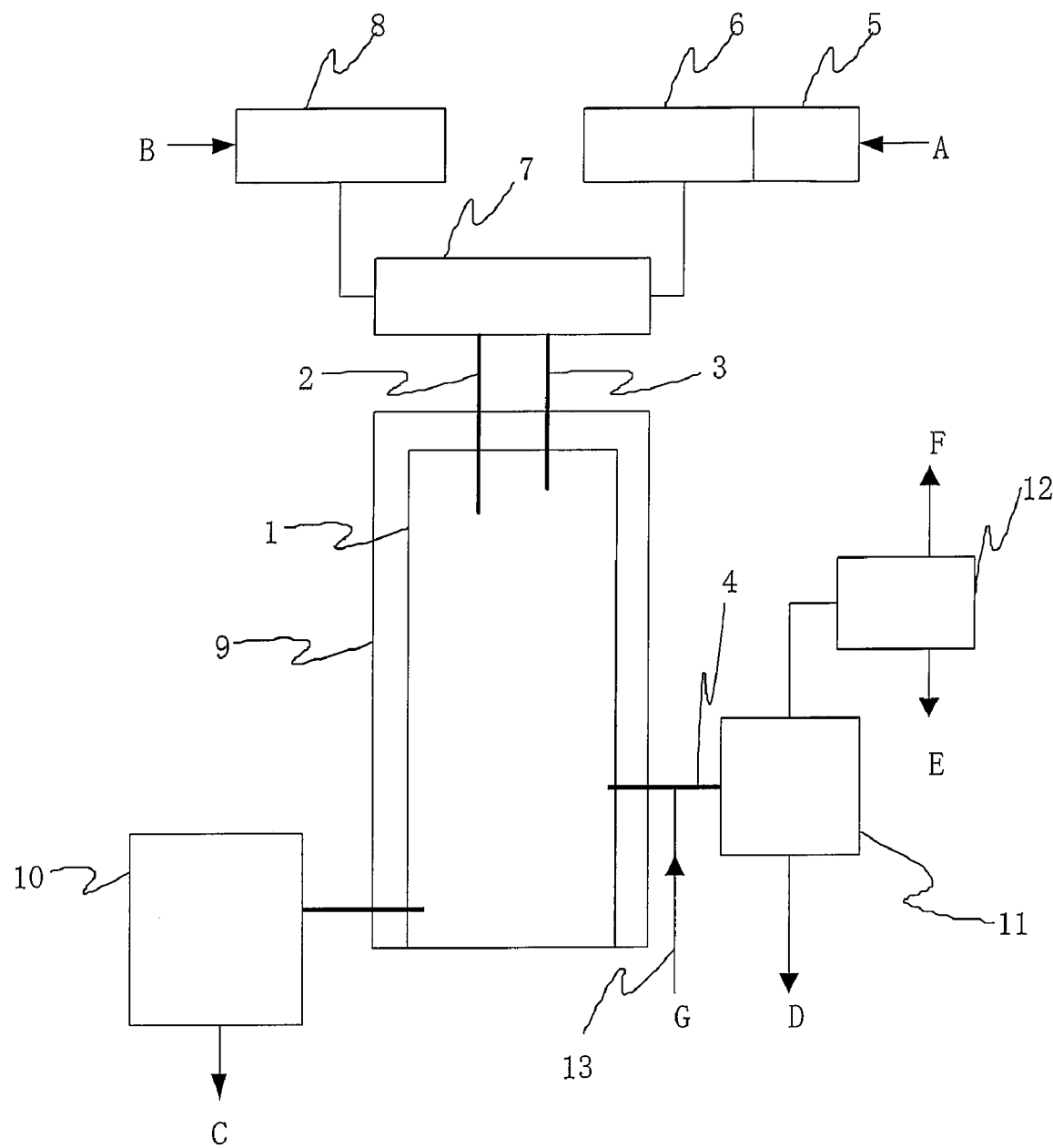
FIG. 1 is a schematic diagram showing an example apparatus for producing polycrystalline silicon that incorporates a device for the reaction of an exhaust gas and a chlorine gas according to the production method of the present invention. The production apparatus for producing polycrystalline silicon according to the present invention includes a step to introduce a chlorine gas G into an exhaust gas extracting pipe 13 connected to a vertical reaction device 1 that produces polycrystalline silicon using a gas phase reaction of silicon chloride B and a reducing agent gas A, to remove impurities contained in an exhaust gas by chlorination, and to cool the exhaust gas rapidly for isolating and recovering a reducing agent chloride from the gas as a liquid or a powder.

Reference will now be made in detail to the present preferred embodiments of the invention, examples of which are illustrated in the accompanying drawings. Wherever possible, the same reference numbers are used in the drawings and the description to refer to the same or like parts.

The present invention is characterized in that, into an exhaust gas generated in a reduction step where silicon chloride undergoes a gas phase reaction with a reducing agent gas in a reactor at a temperature preferably in the range of 800 to 1200° C. to produce polycrystalline silicon, a chlorine gas is introduced from a chlorine gas introducing pipe heated to or maintained at a temperature preferably in the range of 400 to 1200° C. and more preferably in the range of 700 to 1000° C., and an unreacted reducing agent and silicon particles contained in the exhaust gas are allowed to react with the chlorine gas.

In such a method, an unreacted reducing agent and silicon particles contained as impurities in an exhaust gas consisting mainly of a reducing agent chloride generated as a by-product during a reduction step and unreacted silicon chloride can be converted into a reducing agent chloride and silicon chloride, respectively, and the content of impurities in the reducing agent chloride recovered by cooling and condensing the exhaust gas can be exponentially decreased. As a result, the obtained reducing agent chloride can be used for electrolysis in the next step, a fused-salt electrolysis step, without any purification step like melt filtration or distillation. On the other hand, the silicon chloride is recovered together with unreacted silicon chloride existing in the exhaust gas, and reused as a raw material of the reduction step.

Hereinafter, the method for producing polycrystalline silicon according to the present invention will be described in detail. Additionally, polycrystalline silicon in the present invention means silicon that has a purity of 99.99 wt % or more and can be used as a raw material of silicon for solar batteries, and preferably silicon that has a purity of 99.999 wt % or more.

FIG. 1 is a flow chart showing an example method for producing polycrystalline silicon to which the present invention is applied. As shown in FIG. 1, the apparatus for producing polycrystalline silicon according to the present invention includes (i) a reaction step in which a gas phase reaction of silicon chloride as a raw material with a reducing agent gas is conducted to produce polycrystalline silicon; (ii) a chlorination step in which a chlorine gas is blown into an exhaust gas containing a reducing agent chloride gas generated as a by-product, an unreacted silicon chloride gas, an unreacted reducing agent gas and silicon particles as impurities discharged from the reduction reaction step; and (iii) a step of recovering a reducing agent chloride by rapidly cooling the exhaust gas discharged as a result of the chlorination reaction as a liquid or a powder, and then isolating the silicon chloride gas and an unreacted chlorine gas.

Additionally, in the present invention, a gas like a chorosilane expressed by $Si_mH_nCl_{2m+2-n}$ (m is an integer of 1 to 3, and n is an integer being 0 or more although not exceeding 2m+2) and shown in Table 1 can be used as a silicon chloride gas, and in particular, silicon tetrachloride is preferable because it is easily available and is readily recovered without generating a complicated by-product. Further, a silicon chloride gas used is preferably silicon tetrachloride also for the reason that silicon particles are chlorinated into silicon tetrachloride by chlorinating an exhaust gas with chlorine.

feed amount (mole ratio) is in the above-described range, polycrystalline silicon can be stably produced.

An exhaust gas discharged from a reactor after the generation and growth of polycrystalline silicon is a mixed gas containing a reducing agent chloride gas, an unreacted reducing agent gas, silicon particles and unreacted silicon chloride.

Figure 3:
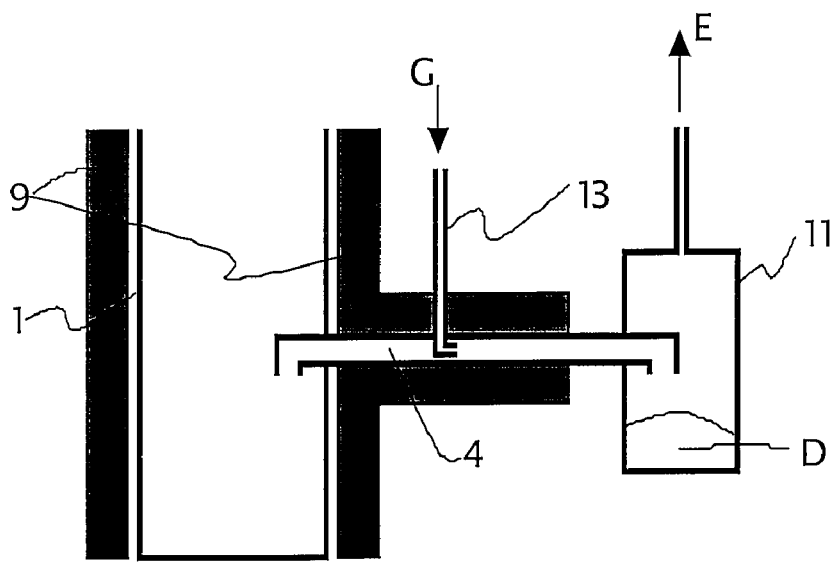
FIG. 3 is a schematic diagram showing an example device for the reaction of an exhaust gas and a chlorine gas according to the production method of the present invention.

A reactor used in the gas phase reaction of the reduction step may be a vertical reactor, in which steps including the feed and reaction of a silicon chloride gas and a reducing agent gas and a step of taking polycrystalline silicon out of the reactor are carried out essentially in a vertical direction, or a horizontal reactor, in which those steps are carried out essentially in a horizontal direction. However, a vertical reactor is preferable because the isolation of polycrystalline silicon produced from an exhaust gas is easy. Polycrystalline silicon generated in the upper part of such a vertical reactor has a high density, and thus the almost full amount of it settles down and precipitates. Therefore, when an exhaust gas extracting pipe is installed in the middle part along the vertical axis of the reactor, it is possible to minimize the entry of polycrystalline silicon into an exhaust gas. The diameter, structure and installation angle of the entrance of an exhaust gas extracting pipe can be determined in such an appropriate manner that silicon particles hardly flow thereinto, considering the amounts of a silicon chloride gas and a reducing agent gas fed to a reduction reactor. For example, a possible constitution may include one shown in FIG. 3, in which the entrance of the exhaust gas extracting pipe is directed downward, thereby decreasing inflow of silicon particles.

TABLE 1

| | n | | | | | | | |
|---|---|---|---|---|---|---|---|---|
| m | 0 | 1 | 2 | 3 | 4 | 5 | 6 | 7 |
| 1 | $SiCl_4$ | $SiHCl_3$ | $SiH_2Cl_2$ | $SiH_3Cl$ | — | — | — | — |
| 2 | $Si_2Cl_6$ | $Si_2HCl_5$ | $Si_2H_2Cl_4$ | $Si_2H_3Cl_3$ | $Si_2H_4Cl_2$ | $Si_2H_5Cl$ | — | — |
| 3 | $Si_3Cl_8$ | $Si_3HCl_7$ | $Si_3H_2Cl_6$ | $Si_3H_3Cl_5$ | $Si_3H_4Cl_4$ | $Si_3H_5Cl_3$ | $Si_3H_6Cl_2$ | $Si_3H_7Cl$ |

Additionally, as a reducing agent gas, there can be used a reducing agent gas based on metal such as sodium (Na), potassium (K), magnesium (Mg) and zinc (Zn), as well as hydrogen gas ($H_2$), and among these, a zinc gas is preferable because it has a relatively low affinity to oxygen and is easy to handle.

(i) Reduction Step

In this step, silicon chloride is reduced with a reducing agent into polycrystalline silicon. Reduction is achieved through a gas phase reaction of a silicon chloride gas and a reducing agent gas. Specifically, it can be conducted by allowing a silicon chloride gas to react with a reducing agent gas in a reactor at a temperature preferably in the range of 800 to 1200° C. and more preferably in the range of 900 to 1100° C. When the reaction temperature is in the above-described temperature range, the reaction of a silicon chloride gas and a reducing agent gas is easily initiated, and a reactor is hardly damaged. Further, examples of the pressure in the reactor may include a pressure in the range of 0 to 500 kPaG.

Further, the feed amount of a silicon chloride gas relative to that of a reducing agent gas (mole ratio) is preferably in the range of 1:10 to 10:1 (silicon chloride gas:reducing agent gas), and more preferably in the range of 1:4 to 4:1. When the As a material for the reactor, quartz, silicon carbide or the like that withstands temperatures in the use temperature range can be used.

(ii) Chlorination Step

In this step, a chlorine gas is blown into an exhaust gas containing a by-product reducing agent chloride gas, an unreacted silicon chloride gas, and impurities such as an unreacted reducing agent gas and silicon particles and discharged from the above-described reduction step (i) in order to chlorinate the unreacted reducing agent gas and silicon particles, thereby decreasing the amount of impurities contained in the reducing agent chloride generated as a by-product. This enables taking a reducing agent chloride with a high purity out of the reactor in the next step, a separation step, eliminates the need for a purification step of the reducing agent chloride for removing impurities such as an unreacted reducing agent gas and silicon particles, such as melt filtration or distillation, and decreases the amount of reducing agent chlorides discarded during such a purification step.

The chlorination is achieved by blowing a chlorine gas at a temperature preferably in the range of 400 to 1200° C. and more preferably in the range of 700 to 1000° C. into the above-described exhaust gas discharged from a reactor used for the gas phase reaction of the reduction step. When the reaction temperature is in the above-described temperature range, chlorination of an unreacted reducing agent gas and silicon particles contained in an exhaust gas easily proceeds.

Further, the feed amount of a chlorine gas relative to that of an exhaust gas (mole ratio) is, when compared with the feed amount of the reducing gas supplied into the reactor in the reduction step, preferably in the range of 1:10 to 10:1 (chlorine gas:reducing agent gas), and more preferably in the range of 1:4 to 4:1. When the feed amount (mole ratio) is in the above-described range, the chlorination of an unreacted reducing agent and silicon particles contained in an exhaust gas easily proceeds.

Figure 2:
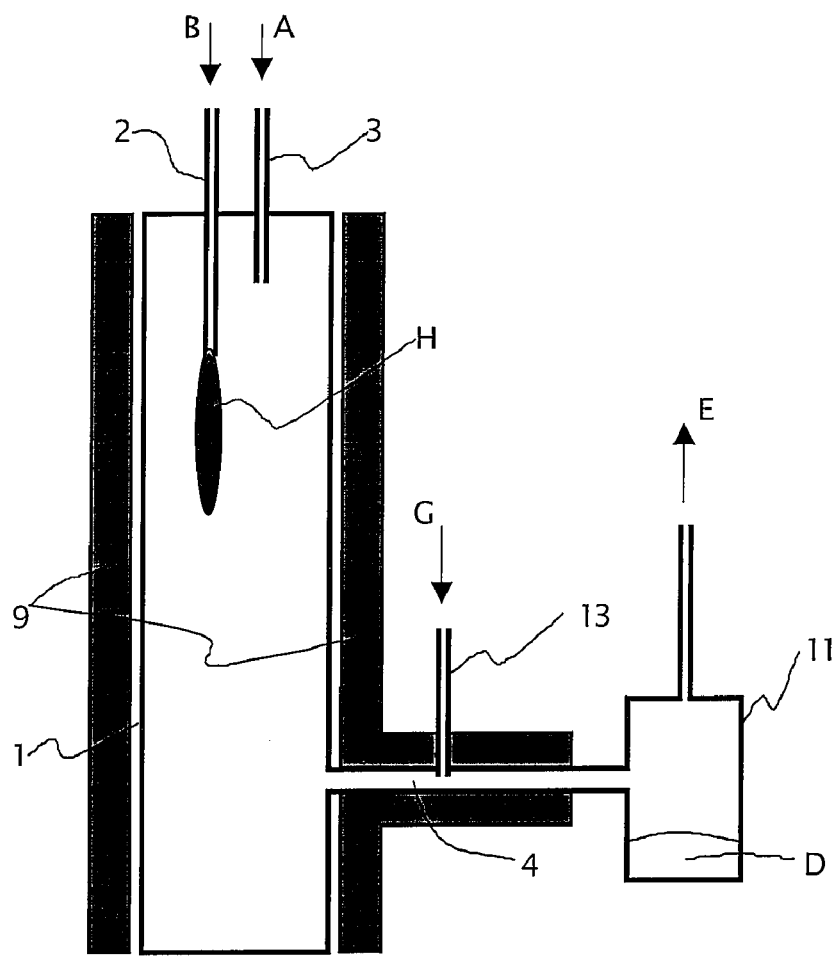
FIG. 2 is a schematic diagram of the test apparatus used in Example 1 to verify the present invention.

This chlorination reaction is conducted by introducing an exhaust gas discharged from the reduction reactor during the above-described reduction step (i) into a chlorination reaction device connected to the reactor, and then blowing a chlorine gas into the exhaust gas from a chlorine gas introducing pipe installed in the chlorination reaction device. The chlorination reaction device may be installed specially or, for example, as shown in FIGS. 1 and 2, a chlorine gas introducing pipe may be connected to an exhaust gas extracting pipe extending from the reactor to use it as a chlorination reaction device.

In the chlorination step, to prevent the chlorine gas blown from flowing back into the reduction reactor, the amount of the exhaust gas flowing into the chlorination step and the feed amount of the chlorine gas are controlled, and this can be achieved also by suitably determining the shape and installation angle of the exit of the chlorine gas introducing pipe. For example, the opening for feeding a chlorine gas of such a chlorine gas introducing pipe may be disposed so as to face a tank for recovering a reducing agent chloride. Further, a suction device may be used before a separation step so that the pressure at the exit of an exhaust gas is decreased during treatment to be lower than that at the entrance thereof.

Additionally, as a material of the chlorination reaction device including the chlorine gas introducing pipe, quartz, silicon carbide or the like that withstands temperatures in the use temperature range can be used.

(iii) Separation Step

In this step, a reducing agent chloride, a silicon chloride gas and an unreacted chlorine gas are isolated and recovered from an exhaust gas discharged as a result of the treatment conducted in the above-described chlorination reaction (ii). As a separation method, there is used a method like one in which the post-treatment exhaust gas is cooled to condense a target component for isolation or one in which a target component is selectively adsorbed for isolation alone or in combination thereof. For example, in the case where zinc is used as the reducing agent and silicon tetrachloride is used as the silicon chloride, cooling the post-treatment exhaust gas preferably to a temperature of 400° C. or less, and more preferably to a temperature of 200° C. or less, converts zinc chloride into a solution or a powder, which is isolated from the tetrachloride gas and an unreacted chlorine gas, and recovered. The recovered reducing agent chloride exhibits, for example, in the case of zinc chloride, a purity of 99.9 wt % or more, thus having a sufficient quality for fused-salt electrolysis.

As described above, in the present invention, the recovered reducing agent chloride substantially contains no impurities, and thus there is no need for a purification device to make the product suitable for fused-salt electrolysis, for example, melt filtration or distillation, and there is no residue due to impurities produced from melt filtration or distillation. Thus, the amount of waste can be lowered.

Further, loss accompanied by purification treatment of a reducing agent chloride is eliminated, and thus the decrease in the recycling amount thereof can be prevented.

Additionally, the silicon chloride gas and the unreacted chlorine gas separated from the reducing agent chloride are further separated and recovered, and then the silicon chloride gas is reused in the reduction step whereas the chlorine gas is reused in the chlorination step or for the production of silicon chloride. Further, the silicon chloride gas and the unreacted chlorine gas can be utilized without separation also for the step of producing silicon chloride.

EXAMPLES

Hereinafter, the present invention will be described in more detail on the basis of an Example, but the present invention is not limited to this Example.

Additionally, a fused-salt electrolysis test of recovered zinc chloride was conducted as follows.

In a quartz test tube having a size of 400 mm in length and 22 mm in inner diameter, 60 g of recovered zinc chloride was charged, and the temperature thereof was raised to 500° C. to melt the recovered zinc chloride with the substitution by nitrogen, and then two carbon stick electrodes each having a diameter of 6 mm were inserted into the test tube so as not to touch the test tube. Thereafter, electrolysis was conducted at a constant current of 3 A for 3 hours to decompose the zinc chloride into zinc and chlorine.

Example 1

The test apparatus constituted as schematically shown in FIG. 2 was made of quartz to verify the invention. There was used a quartz reactor 1 in a vertical cylinder form of 80 mm in inner diameter and 1000 mm in length made so that the upper part thereof had a silicon chloride gas feeding nozzle 2 made of quartz with an inner diameter of 6 mm and a length of 50 mm; a reducing agent gas feeding nozzle 3 made of quartz with an inner diameter of 6 mm and a length of 25 mm; and that the lateral side of the lower part thereof had an exhaust gas extracting pipe 4 made of quartz with an inner diameter of 20 mm. Further, in the exhaust gas extracting pipe 4, a chlorine gas introducing pipe 13 made of quartz and having an inner diameter of 8 mm was inserted, and a tank for recovering a reducing agent chloride 11, which had been cooled by a cooling device, was connected thereto. The tank for recovering a reducing agent chloride 11 further had a pipe for separating and discharging gas components, and its end was guided to a gas treatment device. The reactor 1 was heated by a reactor heating furnace for the whole to be about 950° C. Next, to this reactor 1, a silicon tetrachloride gas at 950° C. was fed from the silicon chloride gas feeding nozzle 2, and after the inside of the reactor was substituted sufficiently with the silicon tetrachloride gas, a zinc gas at 950° C. was started to be fed from the reducing agent gas feeding nozzle 3. The flow rate was controlled so that the mole ratio of the gases fed was 2.3 to 1 (silicon tetrachloride to zinc). Further, at the time of starting the feed of a zinc gas, a chlorine gas was started to be fed from the chlorine gas introducing pipe 13 to the exhaust gas extracting pipe 4 heated to and maintained at 800° C. so that the mole ratio relative to the zinc gas fed was 2.1 to 1 (chlorine to zinc). In addition, as a result of calculations, the flow rates at the exit of the silicon tetrachloride gas nozzle, at the exit of the zinc gas nozzle and of the chlorine gas were respectively 230 mm/s, 99 mm/s and 108 mm/s. After allowing the reaction to proceed for 3 hours, the feed of the silicon tetrachloride gas, zinc gas and chlorine gas was stopped, and the reactor 1 was cooled. The reactor 1 was opened and 2.7 g of polycrystalline silicon was obtained. The purity of this polycrystalline silicon was 99.999 wt % or more. After that, the tank for recovering a reducing agent chloride was opened and 35.7 g of white zinc chloride was obtained. This zinc chloride contained no unreacted zinc, and the purity thereof was 99.94 wt % and water-insoluble substances accounted for 0.06 wt %. This recovered zinc chloride itself was able to be used without any purification treatment as a raw material for fused-salt electrolysis. Additionally, the purity of polycrystalline silicon and the purity of zinc chloride were determined by high-frequency inductively-coupled plasma atomic emission spectrometry (ICP-AES).

Comparative Example 1

Using the same test apparatus as in Example 1, the test was conducted in the same manner as in Example 1 except that there was no feed of a chlorine gas to the exhaust gas extracting pipe at the time of starting the feed of a zinc gas, flow rates of the feed nozzles were according to the mole ratio of silicon tetrachloride to zinc being 0.8 to 1, and the reaction was allowed to proceed for 5 hours. After the feed of the silicon tetrachloride gas and zinc gas was stopped and the reactor was cooled, the reactor and tank for recovering a reducing agent chloride were opened, and 2.5 g of polycrystalline silicon with a purity of 99.999 wt % or more was obtained. From the tank for recovering a reducing agent chloride 11, 12.4 g of a zinc block and 24.1 g of gray zinc chloride including black particles were obtained. The purity of obtained zinc chloride was 98.5 wt % and water-insoluble substances accounted for 1.46 wt %. Major components of these water-insoluble substances were powders of silicon and zinc according to a system for scanning electron microscopy coupled with energy dispersive X-ray analysis (SEM-EDX). When heated to melt without any purification, this recovered zinc chloride was separated into three layers consisting of a transparent layer, a suspension layer and a zinc particle layer, thus being poor in the current efficiency for fused-salt electrolysis and unsuitable for it, so it was necessary to purify the zinc chloride to remove the suspension layer and zinc particle layer before electrolysis.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A production method for producing polycrystalline silicon, wherein the production method conducts a gas phase reaction of a silicon chloride gas and a reducing agent gas in a reactor, comprising a step of blowing a chlorine gas into an exhaust gas containing a reducing agent chloride gas generated as a by-product in the gas phase reaction and unreacted gases to initiate a reaction, a step of separating a reducing agent chloride contained in the exhaust gas from the other impurities, and a step of recovering the reducing agent chloride.

2. The production method for producing polycrystalline silicon of claim 1, wherein the gas phase reaction of the silicon chloride gas and the reducing agent gas is conducted at a temperature in the range of 800 to 1200° C.

3. The production method for producing polycrystalline silicon of claim 1, wherein the reaction initiated by blowing the chlorine gas into the exhaust gas is conducted at a temperature in the range of 400 to 1200° C.

4. The production method for producing polycrystalline silicon of claim 1, wherein the reaction initiated by blowing the chlorine gas into the exhaust gas is conducted by blowing the chlorine gas into the exhaust gas from a chlorine gas introducing pipe installed in a chlorination reaction device connected to the reactor in which the gas phase reaction of the silicon chloride gas and the reducing agent gas is conducted.

5. The production method for producing polycrystalline silicon of claim 4, wherein the chlorination reaction device for the exhaust gas and the chlorine gas is constituted of an exhaust gas extracting pipe that discharges the exhaust gas from the reactor and the chlorine gas introduction pipe connected thereto.

6. The production method for producing polycrystalline silicon of claim 1, wherein a reaction gas generated by a reaction of the exhaust gas and the chlorine gas is cooled so that the reducing agent chloride produced is isolated and recovered as a liquid or a solid.

7. The production method for producing polycrystalline silicon of claim 2, wherein a reaction gas generated by a reaction of the exhaust gas and the chlorine gas is cooled so that the reducing agent chloride produced is isolated and recovered as a liquid or a solid.

8. The production method for producing polycrystalline silicon of claim 3, wherein a reaction gas generated by a reaction of the exhaust gas and the chlorine gas is cooled so that the reducing agent chloride produced is isolated and recovered as a liquid or a solid.

9. The production method for producing polycrystalline silicon of claim 4, wherein a reaction gas generated by a reaction of the exhaust gas and the chlorine gas is cooled so that the reducing agent chloride produced is isolated and recovered as a liquid or a solid.

10. The production method for producing polycrystalline silicon of claim 5, wherein a reaction gas generated by a reaction of the exhaust gas and the chlorine gas is cooled so that the reducing agent chloride produced is isolated and recovered as a liquid or a solid.

11. The production method for producing polycrystalline silicon of claim 1, wherein a reaction gas generated by a reaction of the exhaust gas and the chlorine gas is cooled, and the reducing agent chloride produced is isolated and recovered, and further, from the reaction gas, chlorine and silicon chloride are isolated and recovered.

12. The production method for producing polycrystalline silicon of claim 2, wherein a reaction gas generated by a reaction of the exhaust gas and the chlorine gas is cooled, and the reducing agent chloride produced is isolated and recovered, and further, from the reaction gas, chlorine and silicon chloride are isolated and recovered.

13. The production method for producing polycrystalline silicon of claim 3, wherein a reaction gas generated by a reaction of the exhaust gas and the chlorine gas is cooled, and the reducing agent chloride produced is isolated and recovered, and further, from the reaction gas, chlorine and silicon chloride are isolated and recovered.

14. The production method for producing polycrystalline silicon of claim 4, wherein a reaction gas generated by a reaction of the exhaust gas and the chlorine gas is cooled, and the reducing agent chloride produced is isolated and recovered, and further, from the reaction gas, chlorine and silicon chloride are isolated and recovered.

15. The production method for producing polycrystalline silicon of claim 5, wherein a reaction gas generated by a reaction of the exhaust gas and the chlorine gas is cooled, and the reducing agent chloride produced is isolated and recovered, and further, from the reaction gas, chlorine and silicon chloride are isolated and recovered.

16. The production method for producing polycrystalline silicon claim 1, wherein the silicon chloride gas is at least one kind of gas selected from the group consisting of chlorosilanes expressed by $Si_mH_nCl_{2m+2-n}$ (m is an integer of 1 to 3, and n is an integer being 0 or more although not exceeding 2m+2).

17. The production method for producing polycrystalline silicon of claim 1, wherein the silicon chloride gas is a silicon tetrachloride gas.

18. The production method for producing polycrystalline silicon of claim 1, wherein the reducing agent gas is at least one kind of gas selected from the group consisting of sodium, potassium, magnesium, zinc and hydrogen.

19. The production method for producing polycrystalline silicon of claim 1, wherein the reducing agent gas is a zinc gas.

* * * * *